(12) United States Patent
Sakuma et al.

(10) Patent No.: US 8,115,388 B2
(45) Date of Patent: Feb. 14, 2012

(54) PLASMA DISPLAY DEVICE

(75) Inventors: Hirotaka Sakuma, Kokubunji (JP);
Hitoshi Oaku, Tokyo (JP); Choichiro Okazaki, Kodaira (JP); Shin Imamura, Kokubunji (JP); Masaaki Komatsu, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 480 days.

(21) Appl. No.: 12/247,366

(22) Filed: Oct. 8, 2008

(65) Prior Publication Data

US 2009/0224668 A1    Sep. 10, 2009

(30) Foreign Application Priority Data

Mar. 7, 2008   (JP) .................................. 2008-057165

(51) Int. Cl.
*H01J 17/49* (2006.01)
(52) U.S. Cl. .................. 313/587; 313/582; 313/585
(58) Field of Classification Search ........... 313/582–587
See application file for complete search history.

(56) References Cited

U.S. PATENT DOCUMENTS

| 5,951,915 | A  * | 9/1999 | Hase et al. ............... 252/301.4 F |
| 2003/0085853 | A1 * | 5/2003 | Shiiki et al. ..................... 345/60 |
| 2007/0007494 | A1 * | 1/2007 | Hirosaki et al. ....... 252/301.4 R |
| 2007/0018912 | A1 * | 1/2007 | Shiiki et al. ..................... 345/60 |
| 2007/0194685 | A1 * | 8/2007 | Hirosaki ....................... 313/485 |
| 2007/0247051 | A1 | 10/2007 | Kuze et al. |

FOREIGN PATENT DOCUMENTS

| CN | 1207758 | 2/1999 |
| CN | 1417831 | 5/2003 |
| JP | 2002-332481 | 11/2002 |
| JP | 2003-36048 | 11/2003 |
| JP | 2003-336048 | 11/2003 |
| JP | 2006-012770 | 1/2006 |
| KR | 10-2007-0048809 | 5/2007 |

* cited by examiner

*Primary Examiner* — Bumsuk Won
(74) *Attorney, Agent, or Firm* — Antonelli, Terry, Stout & Kraus, LLP.

(57) ABSTRACT

There is provided a plasma display panel device using phosphors to improve reliability and color reproductivity or color performance. A plasma display panel includes: a discharge gas for generating ultraviolet light as a result of electric discharge, and a phosphor layer containing a phosphor for emitting light as a result of excitation by the ultraviolet light, in which the phosphor contains an Eu activated silicate phosphor added with at least one element selected from Al, Ga, Y and Gd, represented by the following General Formula (1):

$$M1_{3-y}M2Si_2O_8{:}Eu_y \qquad (1)$$

wherein M1 is at least one element selected from the group consisting of Ba, Ca, and Sr; M2 is at least one element selected from the group consisting of Mg and Zn; and y satisfies the condition of $0.001 \leq y \leq 0.2$.

19 Claims, 7 Drawing Sheets

FIG. 1

| ADDED ELEMENTS | LUMINANCE (Br) | x | y | Br/y |
|---|---|---|---|---|
| NONE | 100 | 0.1521 | 0.0543 | 100 |
| Al | 98 | 0.1529 | 0.0493 | 107 |
| Ga | 84 | 0.1527 | 0.0466 | 98 |
| Y | 87 | 0.1541 | 0.0468 | 101 |
| Gd | 50 | 0.1537 | 0.0490 | 56 |

FIG. 2

| Al MATERIAL | LUMINOUS PROPERTIES AFTER WASHING | | | | RETAINING RATE BEFORE AND AFTER WASHING (%) | |
|---|---|---|---|---|---|---|
| | LUMINANCE (Br) | Br/y | x | y | LUMINANCE | Br/y |
| NONE | 100 | 100 | 0.1525 | 0.0501 | 88 | 88 |
| Al(OH)$_3$ | 103 | 105 | 0.1527 | 0.0489 | 97 | 96 |
| Al$_2$O$_3$ | 107 | 107 | 0.1526 | 0.0507 | 99 | 100 |
| AlN | 105 | 102 | 0.1523 | 0.0522 | 97 | 99 |
| (CH$_3$COO)$_3$Al | 108 | 106 | 0.1523 | 0.0521 | 104 | 105 |
| AlF$_3$ | 110 | 121 | 0.1522 | 0.0461 | 103 | 103 |

|  | LUMINANCE (Br) | CHROMATICITY x | CHROMATICITY y | Br/y |
|---|---|---|---|---|
| COMPARATIVE EXAMPLE (BSMS) | 100 | 0.1572 | 0.0595 | 100 |
| EXAMPLE (Al-BSMS) | 108 | 0.1551 | 0.0587 | 114 |

PLASMA DISPLAY DEVICE

CLAIM OF PRIORITY

The present application claims priority from Japanese Patent Application JP 2008-057165 filed on Mar. 7, 2008, the content of which is hereby incorporated by reference into this application.

BACKGROUND OF THE INVENTION

The present invention relates to a plasma display device; and, more particularly, to a plasma display device including plasma display panel as a light emitting device using an Eu activated silicate phosphor which emits light when excited by ultraviolet light in the vacuum ultraviolet region.

In recent years, there has been a high demand for thin type display devices represented by TV sets or PC monitors to save installation space, without having to secure large space for them. Some of eligible examples of slim display devices that have drawn a lot of attention are a plasma display device (hereinafter, PDP) designed to display images using a plasma display panel with a driving unit for the PDP, which is thinner than the cathode ray tube as the light emitting device, a liquid crystal display device designed to display images using a fluorescent lamp as the light emitting device in combination with a liquid crystal display panel, and so forth.

The PDP configuring a plasma display device emits light in the visible region by exciting a phosphor in the phosphor layer upon irradiation with ultraviolet light emitted in a negative glow region in the micro discharge space as an excitation source and thereby accelerating light emission of the phosphor (central wavelengths of the main emission of the ultraviolet light are between 146 nm and 172 nm when xenon gas is used as the rare gas). The plasma display deices display images by controlling the intensity and color of the light emission of the plasma display panel.

Nowadays, there is an increasing demand for plasma display devices with higher luminance and higher emission efficiency to satisfy the display function, particularly for TVs, and so on. Plasma display devices are also required to have better video characteristics for allowing viewers to comfortably appreciate the video contents such as movies, and to ensure a wide color reproduction range of 100% or more with respect to the NTSC (national television system committee) for allowing viewers to enjoy beautiful images. Further, plasma display devices are required to have improved reliability for enabling viewers to have the good image quality over a long period of time.

In order to make progress in plasma display devices of high performance in satisfaction of such needs, it is pretty much crucial to achieve higher performance of PDP that constitutes a plasma display device. More specifically, PDPs should keep abreast with demands in the high luminance for the display function for the TV, the high emission efficiency for achieving the high luminance, improvement of response performance for coping with improvement of video quality, enlargement of color reproduction range, and further, improvement of reliability.

For improvement of performance and characteristics of the PDP, improvement of design and structure and improvement of performances of the members of the PDP play significant roles. Improvement of color reproduction performance and improvement of reliability depend largely on the phosphor among the constituent members in particular. Therefore, the phosphor is highly required to demonstrate higher emission efficiency, better response characteristics in the light emission, and secured color reproduction properties. In addition, performance improvement of deterioration resistance and further, improvement of reliability are highly required.

As phosphors of the current color PDP, phosphors corresponding to three emission colors of red (R), blue (B) and green (G), in other words, a red-emitting phosphor, a blue-emitting phosphor and a green-emitting phosphor are used. As the blue-emitting phosphor, an Eu activated aluminate phosphor ($BaMgAl_{10}O_{17}$:Eu, hereafter, it is referred to as BAM) is broadly used. BAM has excellent characteristics in its light emission but is susceptible to deterioration, in other words, BAM has poor reliability and short life. Thus, it is demanded to make improvement in stability, to achieve long life, and to realize higher photoluminescent brightness. Meanwhile, as Digital Hi-Vision equipment is going to come in wide use in near future, it is also necessary to cover chromaticity scale of the HDTV standard, the standard for Hi-Vision. To comply with the standard, blue chromaticity y value (0.06) should be smaller than NTST chromaticity y value (0.08). In effect, a smaller y value, i.e., deep-blue color, is required to meet the need for blue-emitting phosphor. If it is possible to get even a deeper blue color, plasma display devices are going to have a broader color reproduction range, expressing more varieties of colors.

Moreover, in the technical field of the PDP in parallel with the discussion for achieving high performance of the phosphor materials, many manufacturers have been trying to improve panel structure aiming at high emission efficiency of PDPs.

As a specific method thereof, a technique for actively utilizing $Xe_2$ molecular line (wavelength 172 nm) generated by the electric discharge by increasing the mole fraction of xenon contained in a discharge gas has actively been discussed. Such orientation of the technique is referred to as the trend of the so-called "high Xenon-content" technology in PDP. The main focus of the "high Xenon-content" technology being studied is to increase the mole fraction of Xe in the discharge gas up to 4% or higher, so that high efficacy PDP panels may be achieved.

Under these circumstances, a silicate phosphor is proposed as a blue-emitting phosphor having higher reliability and longer life than BAM of conventional blue-emitting phosphor. To be more specific, $Ca_{1-x}MgSi_2O_6$:$Eu_x$ (hereafter, it is referred to as CMS) (refer to Japanese Patent Application Laid-Open Publication No. 2002-332481), $Sr_{3-x}MgSi_2O_8$:$Eu_x$ (hereafter, it is referred to as SMS) (refer to Japanese Patent Application Laid-Open Publication No. 2003-336048), and $(Ba_xSr_{1-x})_{3-y}MgSi_2O_8$:$Eu_y$ (hereinafter, it is referred to as BSMS) (refer to Japanese Patent Application Laid-Open Publication No. 2006-12770) formed by substituting part of the host lattice with Ba on the basis of SMS were proposed.

The CMS mentioned above emits light having relatively high brightness and good color purity upon, given ultraviolet light in a wavelength range of 146 nm as the excitation source. However, it is known that the excitation band barely exists in a wavelength range of 160 nm to 210 nm as its excitation characteristics. Therefore, the intensity of emission to be generated by the excitation by vacuum ultraviolet light at the vicinity of 172 nm ($Xe_2$ molecular line), which is important for the PDP, is extremely low. In other words, from the aspect of the technical trend heading for high efficacy PDPs, CMS has a low emission efficiency with respect to the $Xe_2$ molecular line at an increasing wavelength of 172 nm, so the effects of substantial improvement in luminance and efficiency are not obtained. Accordingly, when it comes to CMS, apart from its insufficient brightness as remarked under given circumstances and the current technical trend heading for high efficacy PDPs, the CMS is required to have higher emission efficiency in the excitation band of 172 nm wavelength, making practical improvement in real life. Particularly, the silicate phosphors SMS and BSMS disclosed in Japanese Patent Application Laid-Open Publication Nos. 2003-336048 and 2006-12770 are promising novel phosphors because they have high brightness characteristics upon an excitation by light at a wavelength of 146 nm and shows a good emission efficiency also upon an excitation by light at a 172 nm wavelength as compared to CMS.

Meanwhile, part of the fabrication of PDP involves applying a phosphor paste containing phosphor and organic substances as host material onto a substrate, and heating the substrate at a temperature range of 300° C. to 600° C. to obtain phosphor layers. However, it turned out the SMS-based phosphor paste did not much contribute to brightness and chromaticity of resulting phosphor layers probably because it has gone though the heating process. Japanese Patent Application Laid-Open Publication No. 2003-336048 suggests one way of preventing process degradation and operating degradation by heating the prepared SMS phosphor under the oxidizing atmosphere to intentionally increase the substitution ratio of $Eu^{3+}$ ions, thereby decreasing the oxygen defects present in a phosphor crystal.

SUMMARY OF THE INVENTION

However, there are disadvantages of the method disclosed in Japanese Patent Application Laid-Open Publication No. 2003-336048 where the substitution ratio of $Eu^{3+}$ ions is increased through an oxidation process. It is known that phosphors used for $Eu^{3+}$ emission are mostly red emitting phosphors such as $Y_2O_3:Eu^{3+}$ or $(Y, Gd)BO_3:EU^{3+}$. Therefore, increasing the amount of $Eu^{3+}$ ions only adds $Eu^{3+}$-originated red emitting to SMS blue emitting, which consequently degrades the color purity. Obviously, such phosphors are not suitable for fabricating high-quality plasma display devices complying with HDTV standards. In addition, the number of processes for the synthesis of phosphors is also increased. Therefore, there is a need to develop a new scheme that neither degrades the color purity nor makes any change in the conventional phosphor synthesis process but improves the process degradation. Meanwhile, not many studies have been done on the improvement of process degradation associated with the use of BSMS as suggested in Japanese Patent Application Laid-Open Publication No. 2006-12770, so there is room for further studies.

Accordingly, an object of the present invention is to provide a plasma display device, which demonstrates a high emission efficiency upon an excitation by light at a 172 nm wavelength and uses phosphors resistant to luminance degradation and chromaticity deterioration over the washing process following the synthesis of phosphors or the heating process on a phosphor paste, so that the Xenon-content in the discharge gas may be increased.

In order to achieve the above object, the inventors repeatedly studied and tested various methods to improve degradation of BSMS- SMS- or SMS-based phosphors, and thus have completed the present invention by discovering that luminance degradation over the washing process following the synthesis of phosphors or the heating process on a phosphor paste could be prevented by adding trivalent ions to SMS-based phosphors as a constituent element.

In other words, the present invention provides a plasma display device as follows.

According to a preferred embodiment of the present invention, a plasma display device includes:

a pair of substrates arranged at a distance so as to face each other;

barrier ribs arranged between the pair of substrates, for defining a space between the pair of substrates;

an electrode pair arranged on at least one of facing sides of the pair of substrates;

a discharge gas sealed in the space defined by the barrier ribs, for generating ultraviolet light as a result of electric discharge upon application of a voltage to the electrode pair; and a phosphor layer containing a phosphor for emitting light as a result of excitation by the ultraviolet light, formed on at least one of the facing sides of the pair of substrates and wall surfaces of the barrier ribs in the space, wherein the phosphor contains an Eu activated silicate phosphor added with at least one element selected from a group of Al, Ga, Y and Gd, represented by the following General Formula (1):

$$M1_{3-y}M2Si_2O_8:Eu_y \qquad (1)$$

where M1 is at least one element selected from the group consisting of Ba, Ca, and Sr; M2 is at least one element selected from the group consisting of Mg and Zn; and y satisfies the condition of $0.001 \leq y \leq 0.2$.

Preferably, the phosphor used for the plasma display device is composed of the Eu activated silicate phosphor represented by the General Formula (3) and Al as an additive:

$$(Ba_xSr_{1-x})_{3-y}MgSi_2O_8:Eu_y \qquad (3)$$

where x and y respectively satisfy the conditions of $0 \leq x \leq 0.3$ and $0.001 \leq y \leq 0.2$.

In the case of using Al as an additive for the phosphor used in the plasma display device, a mole fraction of Al is greater than 0 and less than 0.2, with respect to 1 mol of the phosphor. Preferably, the mole fraction of Al is greater than 0 and not greater than 0.11, with respect to 0 mol of the phosphor.

The discharge gas contains Xe in a mole fraction of 6% or more, preferably 10% or more, and more preferably 12% or more.

To briefly explain about the advantageous effects of the present invention, phosphor degradation after washing and heating of the phosphor paste can be suppressed. Therefore, it becomes possible to achieve a plasma display device having high luminance, and excellent color reproductivity that reflects particular emission characteristics of the phosphor. Moreover, since the phosphor shows even better emission characteristics upon the excitation by light at a wavelength of 172 nm, the phosphor may be composed by increasing the mole fraction of Xe (gas) in the discharge gas and further the $Xe_2$ molecular line ratio. In this manner, higher efficiency plasma display devices can be obtained.

DESCRIPTION OF SPECIFIC EMBODIMENTS

Hereinafter, embodiments of the present invention will be described in detail with reference to the accompanying drawings. It should be noted that components having the same function are denoted by the same reference symbols throughout the drawings for describing the embodiment, and the repetitive description thereof will be omitted.

As to the relationship between composition of the discharge gas in the PDP and ultraviolet light intensity in result of the discharge, it is known that, the larger a mole fraction of contained Xe is, the higher intensity of the entire vacuum ultraviolet light is generated by the discharge and the greater change is made to the mole fraction of each constituent element in the vacuum ultraviolet light. Specifically, it is known that the intensity ratio ($I_{172}/I_{146}$) of the 146 nm ultraviolet light component and the 172 nm ultraviolet light ($Xe_2$ molecular line) component contained in the vacuum ultraviolet light to be generated varies corresponding to changes in the mole fraction of Xe in the discharge gas, that is, the intensity ratio ($I_{172}/I_{146}$) gets larger with the increase of the mole fraction of Xe.

For the present invention, the inventors have discovered a novel silicate phosphor capable of achieving remarkably high luminance and high efficiency upon excitation by light at a wavelength of 172 nm, and suffering less luminance degradation even after an heating process on the phosphor paste. As a result, a PDP using the novel silicate phosphor was realized as a high luminance, high efficiency novel light emitting device. Therefore, it becomes possible to realize a novel plasma display device with high efficiency and excellent color reproductivity enabling high luminance display.

The novel silicate phosphor achieved in the present invention is an Eu activated phosphor represented by the following General Formula (1) that contains at least one element selected from the group consisting of Al, Ga, Y, and Gd:

$$M1_{3-y}M2_2Si_2O_8:Eu_y \quad (1)$$

wherein M1 is at least one element selected from the group consisting of Ba, Ca, and Sr; M2 is at least one element selected from the group consisting of Mg and Zn; and y satisfies the condition of $0.001 \leq y \leq 0.2$.

The following will now explain some of possible forms of element(s) selected from the group of Al, Ga, Y, and Gd in a phosphor lattice.

The first case is where SMS or BSMS phosphor preserves a large number of tetrahedron structures of $SiO_4$ in its phosphor lattice. It is assumed that one or more elements selected from the group consisting of Al, Ga, Y, and Gd is filled into an octahedron gap between the $SiO_4$ tetrahedron structures. In this case, the additive serves to paste (starch or sizing) the tetrahedron structures of $SiO_4$, so any degradation due to a washing process or degradation in host crystals of the phosphor paste can be suppressed. However, these effects are expected only by the use of elements with relatively small ionic radii because elements having too large ionic radii as compared with the size of the gap are likely to distort the host lattice or cause defects in the host lattice.

Besides, there are a limited number of the octahedron gaps to be filled with an additive. Therefore, using a proper amount of additive is important because any remaining additive may turn to impurities or defects to adversely affect the host lattice structure.

The second case is where an additive is substituted with a constituent element of the host lattice. For example, suppose that an additive is substituted with M2 and an element M4 is substituted as much as 'a' with respect to the amount of M2. Then, a compound represented by the following General Formula (5) can possible be obtained:

$$M1_{3-y}M2_{1-B}M4_aSi_2O_8:Eu_y \quad (5)$$

wherein M1 is at least one element selected from the group consisting of Ba, Ca, and Sr; M2 is at least one element selected from the group consisting of Mg and Zn; M4 is at least one element selected from the group consisting of Al, Ga, Y, and Gd; and 'y' and a' satisfy the conditions of $0.001 \leq y \leq 0.2$ and $a>0$. Similarly, suppose that an additive is substituted with Si and an element M is substituted as much as 'b' with respect to Si. Then, a compound represented by the following General Formula (6) can possible be obtained:

$$M1_{3-y}M2M4_bSi_{2-b}O_8:Eu_y \quad (6)$$

wherein M1 is at least one element selected from the group consisting of Ba, Ca, and Sr; M2 is at least one element selected from the group consisting of Mg and Zn; M4 is at least one element selected from the group consisting of Al, Ga, Y, and Gd; and 'y' and b' satisfy the conditions of $0.001 \leq y \leq 0.2$ and $b>0$.

Further, suppose that an additive is substituted with both Mg and Si, and an element M is substituted as much as 'a' with respect with M2 and as much as 'b' with respect to Si. Then, a compound represented by the following General Formula (7) can possible be obtained:

$$M1_{3-y}M2_{1-a}M4_{a+b}Si_{2-b}O_8:Eu_y \quad (7)$$

wherein M1 is at least one element selected from the group consisting of Ba, Ca, and Sr; M2 is at least one element selected from the group consisting of Mg and Zn; M4 is at least one element selected from the group consisting of Al, Ga, Y, and Gd; and 'y', 'a', and b' satisfy the conditions of $0.001 \leq y \leq 0.2$, $a \geq 0$, and $b \geq 0$. Since the Formula (5) and the Formula (6) are obtained respectively by setting b=0 and a=0 in the Formula (7), the General Formula (7) may be taken as an exemplary formula of a compound for element substitution.

However, the substitution between an additive with a constituent element of the host lattice as in this case changes distance between elements, and crystals are distorted accordingly. The crystal field around Eu gets changed, and chromaticity control can be done. Also, for the substitution between two elements with different valence numbers, structural transformation occurs in order to neutralize the charge. As a result, oxygen defects are decreased and denaturation in host crystals during the washing process or during the heating process on a phosphor paste can be suppressed. Furthermore, since the host crystal structure can be changed or cannot be created at all in the case of excess substitution, it is important, as discussed in the first case, to use an appropriate amount of an additive.

The third case is a combination of the first and second cases.

In either case, host crystals are strengthened by adding an appropriate amount of a trivalent element to the phosphor composition of interest, and further the degradation in luminance during the washing and heating processes can be slowed down or suppressed.

Preferably, the element M2 in the General Formula (1) is Mg because it has a highly luminescent emission color. It also becomes possible to control an emission color by replacing M2 by a mixture of Zn and Mg and by changing the Zn/Mg ratio in a compound of interest.

By preparing a more desirable composition out of all possible compositions that can be obtained from the General Formula (1) containing Ba and Sr for example to render highly luminescent emission colors, i.e., $(Ba_xSr_{1-x})_{3-y}MgSi_2O_8:Eu_y$, and by adding a trivalent element to the phosphor composition, the inventors observed significant improvement in color purity and additional advantages for improvement in resistance to degradation, namely, suppression in luminescence degradation due to process degradation. Further details on their observations and studies will now be provided below.

As for the mole fraction of Ba, x, in the novel Eu activated silicate phosphor in accordance with the present invention, the lower limit of x was set to 0 (i.e., 0<x) considering that Ba is purposefully added during the synthesis of the phosphor. Meanwhile, the upper limit of x was determined in consideration of luminance, chromaticity, and luminance retaining ratio before and after a washing process. It is done so after the inventors observed that the luminance and the chromaticity y value were decreased with an increase in the mole fraction of Ba, x, while the luminance retaining ratio after a washing process was improved with an increase in the mole fraction of Ba, x. After all, a preferable range for the mole fraction of Ba, x, turned out to be $0<x \leq 0.3$.

Figure 1:
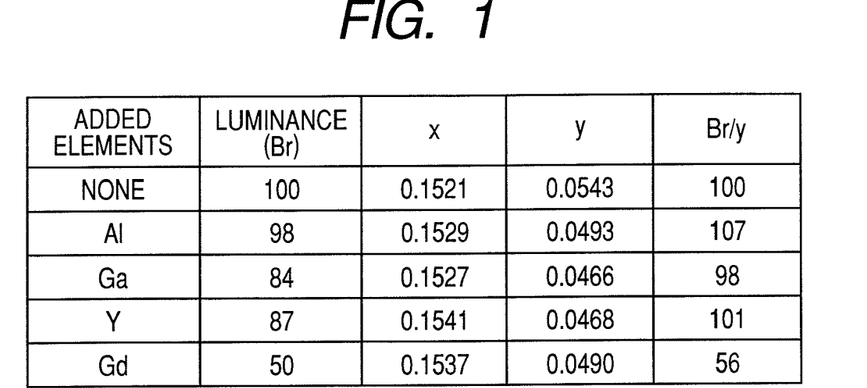
FIG. 1 is a table summarizing the emission characteristics of a BSMS phosphor of the present invention in comparison with BSMS-based phosphors mixed with Al, Ga, Y, and Gd respectively, upon an excitation by 172 nm light.

As discussed earlier, an additive is filled into the gap(s) in the phosphor structure, or is substituted with constituent element(s) of the phosphor. Therefore, the ionic radius of an additive of interest is a critical factor. For this reason, the inventors studied different kinds of additives. FIG. 1 shows emission characteristics in terms of luminance (Br), chromaticity (x, y), and Br/y values (i.e., luminance (Br) value is divided by chromaticity (y) value) of BSMS-based phosphors added with four kinds of elements, namely, Al, Ga, Y, and Gd, upon an excitation by light at a wavelength of 172 nm. Referring to FIG. 1, the addition of Al having a relatively small ionic radius hardly changed the luminance, but it decreased the chromaticity (y) value to achieve high color purity. As a result, Br/y or the intensity of the maximum of the emission band improved. Meanwhile, the addition of Gd or Y did not affect Br/Y or the intensity of the maximum of the emission band at all, so color purity remained high. On the contrary, the addition of Gd having the largest ionic radius as compared with the other elements reduced y value, but it also substantially degraded the luminance and Br/y of the phosphor. Nevertheless, all of the phosphor samples respectively added with those four different kinds of elements had a sufficiently lower blue chromaticity value (y) than the blue chromaticity value (y), 0.06, as defined in the HDTV standards, so they can all be utilized for blue phosphor of high color purity. Note that Al is the most preferable element if luminance and Br/y are taken into consideration. Meanwhile, Ga and Y are also good options if color purity should be of high priority concern.

The introduction of such an additive into a phosphor of interest is done during formation of a host lattice of the phosphor. Therefore, characteristics or properties of the phosphor are greatly affected by melting point (decomposition point) of the starting material of an additive.

Figure 2:
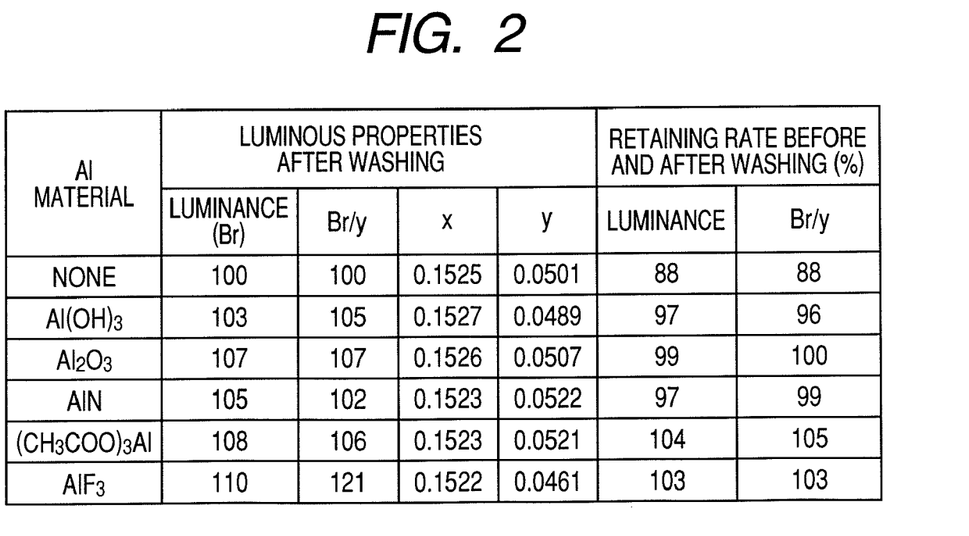
FIG. 2 is a table summarizing the luminance retaining ratio (%) before and after washing, Br/y retaining ratio (%), and emission characteristics after washing, for BSMS in comparison with BSMS mixed with Al provided by different starting materials, upon an excitation by 172 nm light.

In light of this, the inventors studied different kinds of starting materials of Al that has shown satisfactory results in previous studies, each starting material having a different deposition point. As for Al material, five kinds of compounds including $Al(OH)_3$, $Al_2O_3$, AlN, $(CH_3COO)_3Al$, and $AlF_3$ were studied. Further, the inventors evaluated luminance degradation due to a washing process, which is one of problems to be resolved. FIG. 2 is a table that summarizes the evaluation results of phosphor samples in terms of luminance (Br) after washing, Br/y value obtained by dividing Br value by chromaticity (y) value, and luminance/Br/y retaining ratios (%) before and after washing, etc., upon an excitation of by 172 nm light. Here, the luminance after washing and Br/y are relative values, as compared with '100' for those of an additive-free BSMS phosphor. Also, luminance and retaining ratio (%) of Br/y were calculated by {[luminance after washing or Br/y value]/[luminance before washing or Br/y]}×100. As shown in the table, all of the five starting materials were effective against luminance degradation during a washing process. Therefore, Al out of any of the starting materials can be introduced during the phosphor composition to get befits of degradation suppression due to washing. Among those starting materials, however, $AlF_3$ was the best starting material in that it helped the phosphor have the highest luminance and Br/y after washing, the highest luminance retaining ratio before and after washing, and the lowest chromaticity y value.

Figure 3:
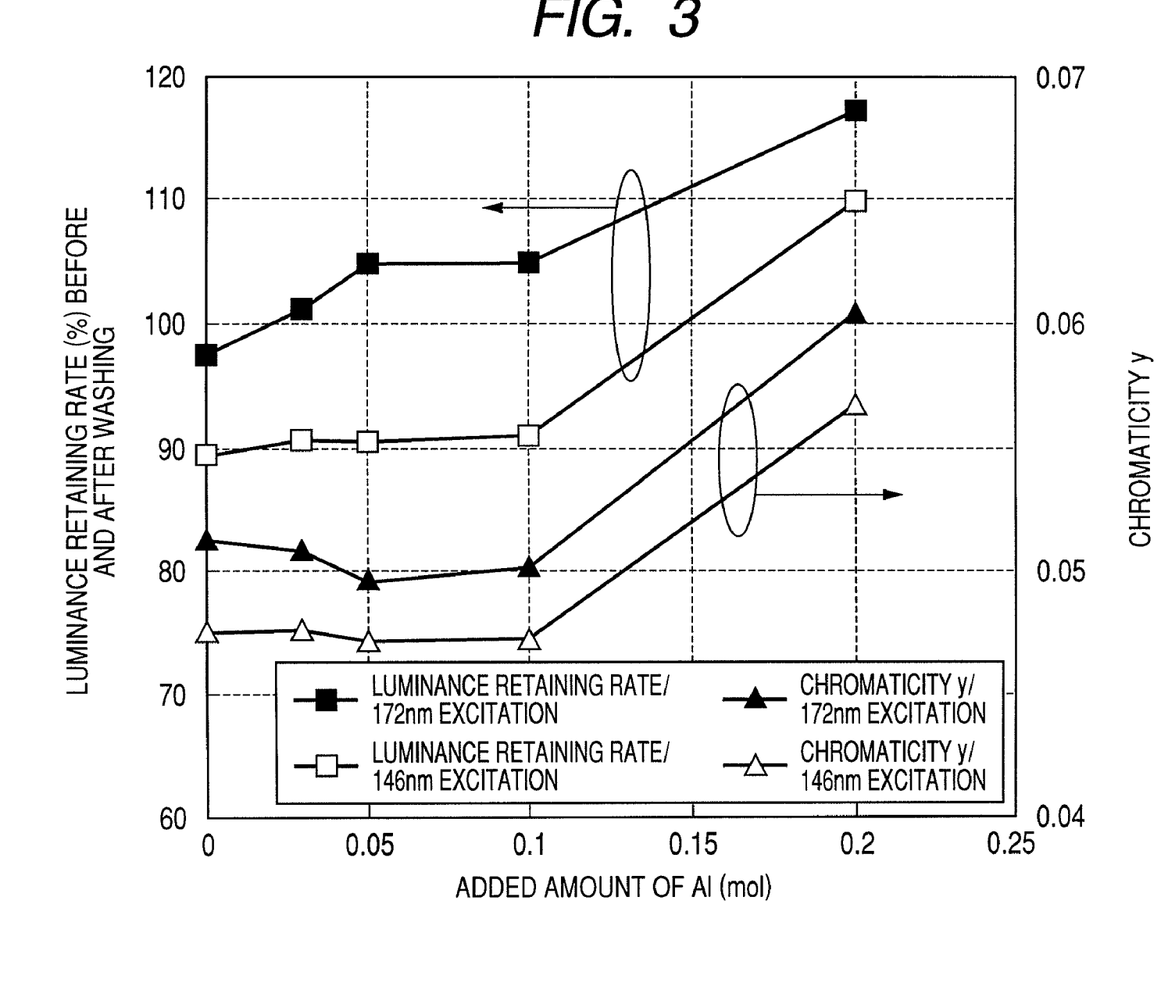
FIG. 3 plots changes in the luminance retaining ratio (%) and chromaticity y of BSMS-Al phosphors in accordance with the present invention, under variable Al amount added to each phosphor sample (e.g., Al content in pure BSMS is 0)

As noted above, it is rather natural to have an optimum amount of an additive to be used, so the inventors tried to find an optimum value for an additive to be added. FIG. 3 is a graph plotting luminance retaining ratio (%) before and after washing and chromaticity y value after washing process on BSMS-Al phosphors, under a variable amount of Al added to each phosphor sample. Luminance retaining ratio (%) was calculated by {[luminance after washing]/[luminance before washing]}×100. From the graph, one can see that luminance retaining ratio monotonously increases with an increasing amount of Al added. That is to say, even a small amount of Al added can suppress luminance degradation of phosphors during the washing process. It is assumed that the amount of Al added (or adjusted) is greater than 0. Meanwhile, one can see from the table that chromaticity y value increased with increasing amount of Al added. For example, when 0.2 mol of Al was added, the chromaticity y value of the phosphor of interest was 0.060. Knowing that the blue chromaticity y defined in the HDTV standards is 0.06, 0.2 mol preferably be the upper limit of the amount of Al added. In short, the amount of Al added is preferably greater than 0 mol and is smaller than 0.2 mol.

Figure 4:
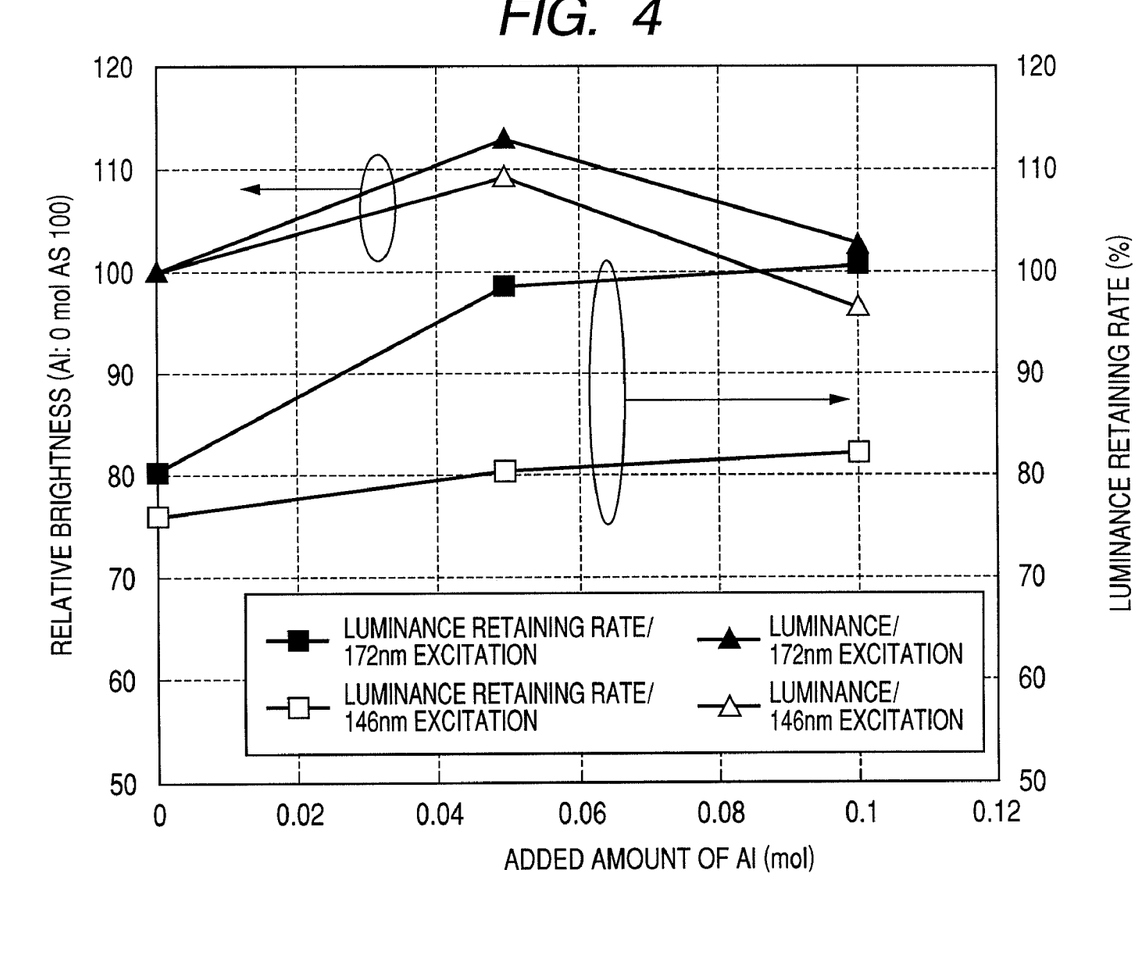
FIG. 4 plots changes in the luminance retaining ratio (%) before and after heating for BSMS-Al mixture used as a phosphor paste in accordance with the present invention, under variable Al amount added to each phosphor sample (e.g., luminance of BSMS after heating is 100)

FIG. 4 is a graph plotting luminance retaining ratio (%) before and after heating of phosphor paste, and relative luminance of each phosphor with respect to an amount of Al added to each phosphor as compared to 100 for luminance of the additive-free BSMS phosphor after heating. Here, luminance retaining ratio (%) before and after heating was calculated by {[luminance after heating]/[luminance before heating]}×100.

Referring to the graph, luminance retaining ratio of an additive-free phosphor paste after heating upon an excitation of 172 nm light was 81, but was increased to 86 and 89 when 0.05 mol of Al and 0.1 mol of Al were added, respectively. In other words, luminance retaining ratio also monotonously increases with an increasing amount of Al added. Furthermore, even after heating, all of the phosphor pastes containing Al had a higher luminance value than that of the additive-free phosphor paste, e.g., luminance after heating of the phosphor paste of interest was 113 in result of adding 0.05 mol of Al and 103 in result of adding 0.1 mol of Al.

Therefore, one may assume from the results shown in FIG. 4 that even a small amount of Al added can effectively suppress luminance degradation of phosphor pastes during the heating process. It is assumed that the lower limit of the amount of Al added is greater than 0. Also, one can see from the table in FIG. 4 that luminance of a phosphor paste containing 0.1 mol of Al is still high after heating, as compared to that of the additive-free phosphor paste. In the light of this, one can extrapolate that luminance of a phosphor paste containing 0.11 mol of Al after heating will be approximately equal to that of the additive-free phosphor paste. Therefore, taking the luminance into consideration, one may set the upper limit of the amount of Al added to 0.11 mol.

In short, the amount of Al added is preferably greater than 0 mol and smaller than 0.2 mol, more preferably greater than 0 mol and smaller than 0.11 mol.

Meanwhile, the mole fraction (y) of Eu, an activator in the novel Eu activated silicate phosphor in accordance with the present invention has a lower limit where significant emission effects were sufficiently demonstrated, while an upper limit where degradation of the emission efficiency due to the concentration quenching phenomenon can be avoided. In other words, complying with the notation(s) used in the General Formula (1), the mole fraction (y) of Eu is preferably in a range of 0.001 to 0.2, i.e., $0.001 \leq y \leq 0.2$.

The following will now explain about the relationship between high Xenon-content effects in PDP and the novel Eu activated silicate phosphors of the present invention. As noted earlier, in PDPs, as the mole fraction of Xe in the discharge gas increases, a total amount of vacuum ultraviolet light increases, and so does an intensity ratio between the ultraviolet light component at 172 nm ($Xe_2$ molecular line) and the ultraviolet light component at 146 nm included in the generated vacuum ultraviolet light, ($I_{172}/I_{146}$).

Figure 5:
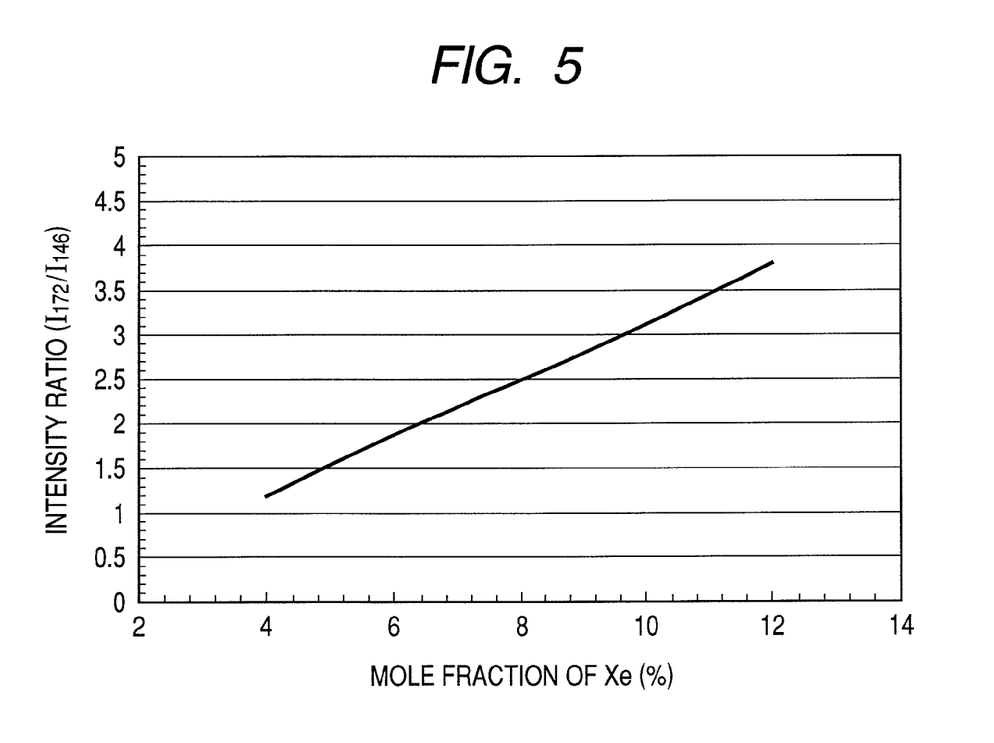
FIG. 5 is a graph showing the relationship between the mole fraction of Xe in a discharge gas filled into an AC plasma display panel and the intensity ratio.

FIG. 5 is a graph showing the relationship between the mole fraction (%) of Xe in the discharge gas in an AC PDP and the intensity ratio ($I_{172}/I_{146}$). The mole fraction of Xe is expressed as a percentage of the volume of Xe gas in the discharge gas on the total volume of the discharge gas. As a result of the studies, in case of the AC PDP, when the mole fraction of Xe is 4% the intensity ratio ($I_{172}/I_{146}$) (4%) is equal to 1.2. It is known that conventional PDPs having the mole fraction of Xe between 1 and 4% show the ultraviolet light component at 146 nm and the ultraviolet light component at 172 nm included in the vacuum ultraviolet light generated by the discharge at an intensity ratio where the intensity of the 172 nm component is somewhat larger than or equal to, or rather smaller than that of the 146 nm component.

Moreover, as a result of further studies, with the mole fraction of Xe of 6%, as the total intensity of vacuum ultraviolet light to be generated by the discharge increases, the ratio of $I_{172}/I_{146}$(6%) increases markedly, i.e., $I_{172}/I_{146}$(6%)=1.9. And, with the mole fraction of Xe of 10%, as the intensity of vacuum ultraviolet light to be generated by the discharge increases more, the ratio of $I_{172}/I_{146}$(10%) increases markedly, i.e., $I_{172}/I_{146}$(10%)=3.1. Moreover, with the ratio of the mole fraction of Xe of 12%, as the intensity of vacuum ultraviolet light to be generated by the discharge increases even further, the ratio $I_{172}/I_{146}$(12%) gets extremely larger, i.e., $I_{172}/I_{146}$(12%)=3.8.

Therefore, in the case of the high-Xe content PDP designs having a mole fraction of Xe of, for example, 6% which is larger than the PDP with the ordinary specification in the mole fraction of Xe in the discharge gas, contribution of the characteristics of the phosphors to be used to the 172 nm vacuum ultraviolet light gets larger. This suggests that it should be preferable to use a phosphor excellent in light emission with superior characteristics such as high brightness with respect to the 172 nm wavelength ultraviolet light.

Moreover, according to the novel Eu activated silicate phosphors of the present invention represented by the above-mentioned General Formula (1), the dependency of the preventing effect of luminance degradation in the heating process on a phosphor paste on the amount of Al added is more noticeable in the excitation by ultraviolet light at 172 nm than that of 146 nm so that the optimum range of the amount of Al added is clearer, as shown in FIG. 4. Therefore, under conditions where excitation by ultraviolet light of 172 nm plays a prominent role, more significant effects and remarkable characteristics in terms of luminance, efficiency, or the like, are demonstrated.

Therefore, when the novel Eu activated silicate phosphors of the present invention represented by the General Formula (1) as explained earlier are used for a PDP using a discharge gas containing Xe (gas) at a mole fraction of 6% or more, more preferably 10% or more, and most preferably 12% or more, the excellent emission characteristics are obtained with a more advantageous use of $Xe_2$ molecular line generated in the PDP, such that a high performance PDP and further a high performance plasma display device can be provided.

Based on the descriptions provided above, one embodiment of the AC PDP using the Eu activated silicate phosphors of the present invention represented by the above-mentioned General Formula (1) is configured as follows. a1

Figure 6:
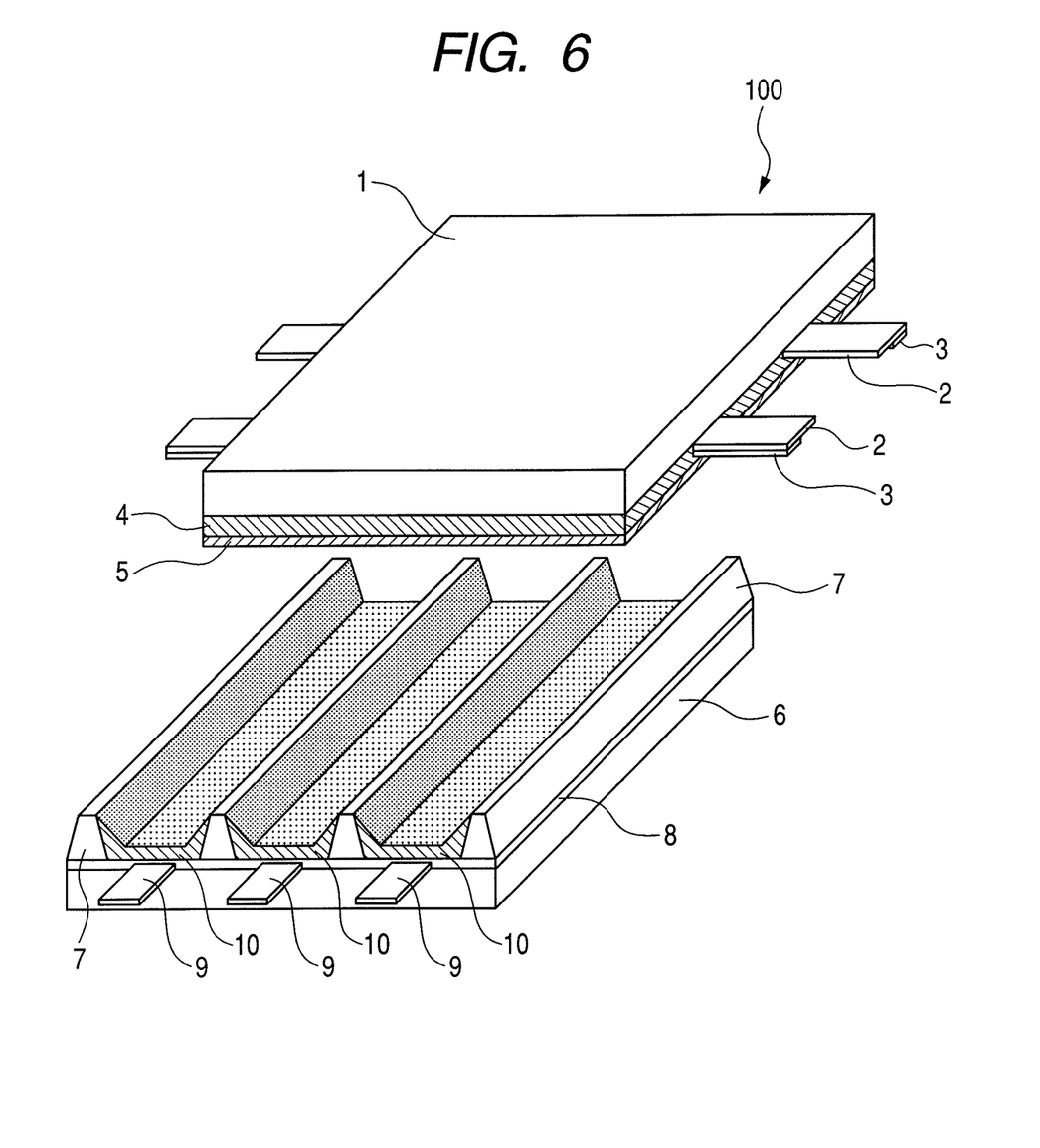
FIG. 6 is an exploded perspective view showing a structure of a plasma display panel in accordance with one embodiment of the present invention.

FIG. 6 is an exploded perspective view illustrating main parts included in one exemplary configuration of a PDP. A PDP 100 as an embodiment of the present invention has a structure corresponding to so-called surface discharge, which includes: a pair of substrates 1 and 6 arranged at a distance so as to face each other; barrier ribs 7 arranged on a facing side of the substrate 6, for keeping the distance and forming a space defined between the substrates 1 and 6 when they are superimposed; electrodes 2 and 9 arranged on the facing sides of the substrates 1 and 6; and a discharge gas (not shown) sealed in the space defined between the substrates 1 and 6 for generating ultraviolet light as a result of electric discharge upon application of a voltage to the electrode 2 or the electrodes 2 and 9. A phosphor layer 10 containing the Eu activated silicate phosphor represented by the above-mentioned General Formula (1) is formed on one of the facing sides of the pair of substrates 1 and 6 (substrate 6 side) and on wall surfaces of the barrier rib 7. The phosphor layer 10 normally includes phosphors corresponding to light emission of three colors including red, blue, and green, i.e., a red-emitting phosphor, a blue-emitting phosphor or a green-emitting phosphor such that the Eu activated silicate phosphor represented by the General Formula (1) for providing blue color in the phosphor layer 10 as well as the phosphors for providing the other colors (red and green) are excited by vacuum ultraviolet light of 146 nm and 172 nm wavelengths generated from the above-mentioned discharge gas by the electric discharge, and thus emit visible light. Note that, a line indicated by the reference numeral 3 shown in FIG. 6 is a bus-line made of Ag or Cu—Cr provided integrally with the electrode 2 for lowering electrode resistance, layers indicated by the reference numerals 4 and 8 are dielectric layers, and a layer indicated by the reference numeral 5 is a protective film provided to protect the electrode. Hereinafter, preferred embodiments of the present invention will be explained.

EMBODIMENT 1

To fabricate a plasma display panel as a first embodiment of the present invention, the inventors first synthesized an Eu activated silicate phosphor as an essential constituent element of the present invention. The first phosphor being synthesized was obtained by adding 0.03 mol of Al to $(Ba_{0.25}Sr_{0.75})_{2.93}MgSi_2O_8:Eu_{0.07}$.

For the synthesis of a phosphor, $SrCO_3$, $BaCO_3$, $MgCO_3$, $SiO_2$, $EuPO_4$, and $Al(OH)_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.023 g). Then, 0.30 mol of $NH_4Cl$ as a flux was added with respect to 1 mol of the phosphor, and fully mixed with the other material powders in an agate mortar.

Thereafter, the obtained mixture was filled into a heat-stable vessel and heated first for 2 hours at 600° C. in the atmosphere and then for 3 hours at 1200° C. in a reducing atmosphere. The obtained product was then pulverized, washed with water and dried so as to obtain a silicate phosphor of the above composition.

Next, 0.03 mol of Ga was added to the phosphor $(Ba_{0.25}Sr_{0.75})_{2.93}MgSi_2O_8:Eu_{0.07}$.

The same procedure as described above was used except $SrCO_3$, $BaCO_3$, $MgCO_3$, $SiO_2$, $EuPO_4$, and $GaF_3$ were weighed to have a mole ratio of Sr:Ba:Mg:Si:Eu:Ga at 2.197 (3.243 g):0.733 (1.446 g):1.0 (0.959 g):2.0 (1.202 g):0.07 (0.173 g):0.03 (0.038 g).

Next, 0.03 mol of Y was added to the phosphor $(Ba_{0.25}Sr_{0.75})_{2.93}MgSi_2O_8:Eu_{0.07}$.

Again, the same procedure as described above was used except $SrCO_3$, $BaCO_3$, $MgCO_3$, $SiO_2$, $EuPO_4$, and $Y_2O_3$ were weighed to have a mole ratio of Sr:Ba:Mg:Si:Eu:Y at 2.197 (3.243 g):0.733 (1.446 g):1.0 (0.959 g):2.0 (1.202 g):0.07 (0.173 g):0.03 (0.034 g).

Next, 0.03 mol of Gd was added to the phosphor $(Ba_{0.25}Sr_{0.75})_{2.93}MgSi_2O_8:Eu_{0.07}$.

Again, the same procedure as described above was used except $SrCO_3$, $BaCO_3$, $MgCO_3$, $SiO_2$, $EuPO_4$, and $GdF_3$ were weighed to have a mole ratio of Sr:Ba:Mg:Si:Eu:Gd at 2.197 (3.243 g):0.733 (1.446 g):1.0 (0.959 g):2.0 (1.202 g):0.07 (0.173 g):0.03 (0.064 g).

Finally, $(Ba_{0.25}Sr_{0.75})_{2.93}MgSi_2O_8:Eu_{0.07}$ was synthesized as a comparative example.

The same procedure as described above was used except $SrCO_3$, $BaCO_3$, $MgCO_3$, $SiO_2$, and $EuPO_4$ were weighed to have a mole ratio of Sr:Ba:Mg:Si:Eu at 2.197 (3.243 g):0.733 (1.446 g):1.0 (0.959 g):2.0 (1.202 g):0.07 (0.173 g).

Next, evaluation was made on emission characteristics of each phosphor sample according to an ordinary method using a vacuum ultraviolet excimer lamp with a 172 nm central emission wavelength as an excitation light source. Luminance (Br), chromaticity (x, y), and Br/y value obtained by dividing luminance (Br) by chromaticity y were used as evaluation indexes. The results are provided in FIG. 1.

As evident in FIG. 1, luminance of the phosphor containing Al was 98 but showed an improvement in Br/y to 107, as compared with the additive-free phosphor. Also, its chromaticity 'y' value was reduced to achieve high color purity. In the case of the phosphor containing Ga, Br/y value was 98, while its luminance was slightly degraded to 84. Yet, the chromaticity 'y' value was smaller than that of Al-containing phosphor to achieve even higher color purity. The phosphor containing Y exhibited approximately the same characteristics with the phosphor containing Ga. Meanwhile, the phosphor containing Gd had a small chromaticity 'y' value to achieve high color purity, but its luminance was noticeably degraded to 50. One possible reason for finding the best characteristics in the Al-containing phosphor is because the ionic radius of $Al^{3+}$ in 6 coordinate covalent bonds is pretty much same as the size of an octahedron gap between the $SiO_4$ tetrahedron structures in BSMS, such that no excessive distortion occurs to the host crystal structure. On the other hand, since Gd has an ionic radius 1.8 times larger than that of $Al^{3+}$, the structure of host crystals is much more likely to disturbed. Therefore, this contributes to differences in characteristics of them.

The foregoing studies also indicate that each of the phosphors containing one of four different kinds of elements, respectively, has a blue chromaticity 'y' value equal to or lower than the blue chromaticity 'y' value (i.e., 0.06) defined in the HDTV standards, which means that the addition of any of those four elements hardly affects the chromaticity, but it rather brings advantageous effects of high color purity.

EMBODIMENT 2

To fabricate a plasma display panel as the first embodiment of the present invention, the inventors first synthesized an Eu activated silicate phosphor as an essential constituent element of the present invention.

The first phosphor being synthesized was obtained by adding 0.03 mol of $Al(OH)_3$ as a starting material to $(Ba_{0.25}Sr_{0.75})_{2.93}MgSi_2O_8:Eu_{0.07}$.

For the synthesis of a phosphor, $SrCO_3$, $BaCO_3$, $MgCO_3$, $SiO_2$, $EuPO_4$, and $Al(OH)_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.023 g). Then, 0.30 mol of $NH_4Cl$ as a flux was added with respect to 1 mol of the phosphor, and fully mixed with the other material powders in an agate mortar.

Thereafter, the obtained mixture was filled into a heat-stable vessel and heated first for 2 hours at 600° C. in the atmosphere and then for 3 hours at 1200° C. in a reducing atmosphere. The obtained product was then pulverized, washed with water and dried so as to obtain a silicate phosphor of the above composition.

Next, 0.03 mol of $Al2O_3$ was added as a starting material to the phosphor $(Ba_{0.25}Sr_{0.75})_{2.93}MgSi_2O_8:Eu_{0.07}$.

The same procedure as described above was used except $SrCO_3$, $BaCO_3$, $MgCO_3$, $SiO_2$, $EuPO_4$, and $Al_2O_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.015 g).

Next, 0.03 mol of AlN was added as a starting material to the phosphor $(Ba_{0.25}Sr_{0.75})_{2.93}MgSi_2O_8:Eu_{0.07}$.

Again, the same procedure as described above was used except $SrCO_3$, $BaCO_3$, $MgCO_3$, $SiO_2$, $EuPO_4$, and AlN were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.012 g).

Next, 0.03 mol of $(CH_3COO)_3Al$ was added as a starting material to the phosphor $(Ba_{0.25}Sr_{0.75})_{2.93}MgSi_2O_8:Eu_{0.07}$.

Again, the same procedure as described above was used except $SrCO_3$, $BaCO_3$, $MgCO_3$, $SiO_2$, $EuPO_4$, and (CH$_3$COO)$_3$Al were weighed to have a mole ratio of Sr:Ba: Mg:Si:Eu:Al at 2.197 (3.243 g):0.733 (1.446 g):1.0 (0.959 g):2.0 (1.202 g):0.07 (0.173 g):0.03 (0.05 g).

Next, 0.03 mol of AlF$_3$ was added as a starting material to the phosphor (Ba$_{0.25}$Sr$_{0.75}$)$_{2.93}$MgSi$_2$O$_8$:Eu$_{0.07}$.

Again, the same procedure as described above was used except SrCO$_3$, BaCO$_3$, MgCO$_3$, SiO$_2$, EuPO$_4$, and AlF$_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.025 g).

Finally, (Ba$_{0.25}$Sr$_{0.75}$)$_{2.93}$MgSi$_2$O$_8$:Eu$_{0.07}$ was synthesized as a comparative example.

The same procedure as described above was used except SrCO$_3$, BaCO$_3$, MgCO$_3$, SiO$_2$, and EuPO$_4$ were weighed to have a mole ratio of Sr:Ba:Mg:Si:Eu at 2.197 (3.243 g):0.733 (1.446 g):1.0 (0.959 g):2.0 (1.202 g):0.07 (0.173 g).

Next, evaluation was made on emission characteristics of each phosphor sample containing Al before and after washing in comparison with the Al-free BSMS, according to an ordinary method using a vacuum ultraviolet excimer lamp with a 172 nm central emission wavelength as an excitation light source. The results are provided in FIG. 2. In detail, FIG. 2 is a table summarizing luminance (Br) before and after washing, Br/y value obtained by dividing luminance (Br) value by chromaticity y value of an emission color, and retaining ratios (%) of luminance and Br/y before and after washing of each sample upon an excitation by 172 nm light. Here, the luminance after washing and Br/y are relative values, as compared with '100' for those of an additive-free BSMS phosphor. Also, luminance and retaining ratio (%) of Br/y were calculated by {[luminance after washing or Br/y value]/[luminance before washing or Br/y]}×100.

From the results in FIG. 2, one can learn that all of the five starting materials demonstrated improvements in luminance and Br/y retaining ratios before and after washing, as compared with those of the additive-free BSMS. In particular, the best retaining ratios (>100%) were achieved by the phosphor sample that has used (CH$_3$COO)$_3$Al, AlF$_3$ as a starting material. It is assumed that the washing process, instead of causing luminance degradation, must have served its original purpose of removing the remaining water-soluble flux or non-reactive impurities. Among those starting materials, AlF$_3$ turned out to be the best starting material, showing 10% and 21% higher values in luminance and Br/y after washing even as compared with those of BSMS. It is believed that since AlF$_3$ has a melting point (1040° C.) close to the reaction temperatures (1000 and 1200° C.) at the time of the synthesis of the phosphor, diffusion in the phosphor lattice or substitution with Mg and Si must have been carried out very actively.

The foregoing studies proved that all of the five starting materials of Al were effective against luminance degradation during a washing process. Among those starting materials, however, AlF$_3$ yielded the best effects.

EMBODIMENT 3

To fabricate a plasma display panel as the first embodiment of the present invention, the inventors first synthesized an Eu activated silicate phosphor as an essential constituent element of the present invention.

The first phosphor being synthesized was obtained by adding 0.03 mol of Al to (Ba$_{0.25}$Sr$_{0.75}$)$_{2.93}$MgSi$_2$O$_8$:Eu$_{0.07}$.

For the synthesis of a phosphor, SrCO$_3$, BaCO$_3$, MgCO$_3$, SiO$_2$, EuPO$_4$, and AlF$_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.03 (0.025 g). Then, 0.30 mol of NH$_4$Cl as a flux was added with respect to 1 mol of the phosphor, and fully mixed with the other material powders in an agate mortar.

Thereafter, the obtained mixture was filled into a heat-stable vessel and heated first for 2 hours at 600° C. in the atmosphere and then for 3 hours at 1200° C. in a reducing atmosphere. The obtained product was then pulverized, washed with water and dried so as to obtain a silicate phosphor of the above composition.

Next, 0.05 mol of Al was added to the phosphor (Ba$_{0.25}$Sr$_{0.75}$)$_{2.93}$MgSi$_2$O$_8$:Eu$_{0.07}$. The same procedure as described above was used except SrCO$_3$, BaCO$_3$, MgCO$_3$, SiO$_2$, EuPO$_4$, and AlF$_3$ were weighed to have a mole ratio of Sr:Ba:Mg:Si:Eu:Al at 2.197(3.243 g):0.733(1.446 g):1.0 (0.959 g):2.0(1.202 g):0.07(0.173 g):0.05(0.042 g).

Next, 0.1 mol of Al was added to the phosphor (Ba$_{0.25}$Sr$_{0.75}$)$_{2.93}$MgSi$_2$O$_8$:Eu$_{0.07}$.

Again, the same procedure as described above was used except SrCO$_3$, BaCO$_3$, MgCO$_3$, SiO$_2$, EuPO$_4$, and AlF$_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.1 (0.084 g).

Next, 0.2 mol of Al was added to the phosphor (Ba$_{0.25}$Sr$_{0.75}$)$_{2.93}$MgSi$_2$O$_8$:Eu$_{0.07}$.

Again, the same procedure as described above was used except SrCO$_3$, BaCO$_3$, MgCO$_3$, SiO$_2$, EuPO$_4$, and AlF$_3$ were weighed to have a mole ratio of Sr:Ba:Mg:Si:Eu:Al at 2.197 (3.243 g):0.733 (1.446 g):1.0 (0.959 g):2.0 (1.202 g):0.07 (0.173 g):0.2 (0.168 g).

Next, (Ba$_{0.25}$Sr$_{0.75}$)$_{2.93}$MgSi$_2$O$_8$:Eu$_{0.07}$ was synthesized as a comparative example.

The same procedure as described above was used except SrCO$_3$, BaCO$_3$, MgCO$_3$, SiO$_2$, and EuPO$_4$ were weighed to have a mole ratio of Sr:Ba:Mg:Si:Eu at 2.197 (3.243 g):0.733 (1.446 g):1.0 (0.959 g):2.0 (1.202 g):0.07 (0.173 g).

Next, evaluation was made on emission characteristics of each BSMS phosphor sample containing Al before and after washing in comparison with the Al-free BSMS, according to an ordinary method using a vacuum ultraviolet excimer lamp with 172 nm and 146 nm central emission wavelengths as an excitation light source. The results are provided in FIG. 3. FIG. 3 is a graph plotting luminance retaining ratio (%) before and after washing and chromaticity y value after washing process of the synthesized BSMS-Al mixtures, in relation to a variable amount of Al added to each phosphor sample. Here, luminance retaining ratio (%) was calculated by {[luminance after washing]/[luminance before washing]}×100.

From the graph in FIG. 3, while the luminance retaining ratio of BSMS was 98% under 172 nm excitation, the luminance retaining ratio of the other Al-containing phosphor samples was monotonously increased from 101%, 105%, 105%, up to 117% with increasing amount of Al added from 0.03 mol, 0.05 mol, 0.1 mol, up to 0.2 mol. As for chromaticity, although 'y' value was reduced to 0.1 mol in some of Al-containing BSMS phosphor samples, it was as high as 0.06 in the case of BSMS containing 0.2 mol of Al, as compared with that of the Al-free BSMS. Meanwhile, blue chromaticity y value of the BSMS phosphor sample containing 0.2 mol of Al was equal to or smaller than the blue chromaticity y value (0.06) defined in the HDTV standards.

The following will now explain about emission characteristics under 146 nm excitation. As shown in FIG. 3 and similarly to the emission characteristics under 172 nm excitation, luminance retaining ratio increases with increasing amount of Al added. However, as compared with the luminance retaining ratios under the 172 nm excitation, the improvement effects on luminance retaining ratio in result of the addition of Al up to 0.1 mol were abit sluggish or degraded. Meanwhile, similar to the results in the case of 172 nm excitation, chromaticity value of each of BSMS phosphor samples containing less than 0.1 mol of Al was smaller than that of Al-free BSMS phosphor. However, the BSMS phosphor sample containing 0.2 mol of Al had a higher chromaticity value than that of Al-free BSMS phosphor. These studies confirm that the Al addition is effective for improving luminance retaining ratio of phosphors throughout the washing process, and more drastic effects were revealed under 172 nm excitation.

The following will now present evaluation results on emission characteristics of BSMS phosphor samples containing 0.05 and 0.1 mol of Al, respectively, in comparison with emission characteristics of Al-free BSMS, before and after an heating process on a phosphor paste.

First, a phosphor paste was prepared as follows. With respect to 100% by weight of a phosphor paste to be prepared, 35 wt % of each of blue-emitting phosphors and 65 wt % of a mixture of cellulose based resin, diethyl glycol monobutyl ether, and diethyl glycol monobutyl acetate were weighed and fully kneaded together.

Phosphor paste powder after heating was then obtained as follows. First, the obtained phosphor paste was applied onto a glass substrate and dried at 130° C., followed by further heating for 30 minutes at 450° C. in the atmosphere. The phosphor film thus obtained was collected from the glass substrate in form of powder.

Next, evaluation was made on emission characteristics of each of the synthesized Al-containing BSMS phosphor samples before and after heating on the phosphor paste in comparison with the Al-free BSMS, according to an ordinary method using a vacuum ultraviolet excimer lamp with 172 nm and 146 nm central emission wavelengths as an excitation light source. The results are provided in FIG. 4. FIG. 4 plots evaluation results on luminance retaining ratio (%) before and after heating of phosphor paste, and relative luminance of each phosphor with respect to an amount of Al added to each phosphor as compared to 100 for luminance of the additive-free BSMS phosphor after heating. Here, luminance retaining ratio (%) before and after heating was calculated by {[luminance after heating]/[luminance before heating]}×100.

As can be seen from the graph, luminance retaining ratio of an additive-free BSMS before and after heating of a phosphor paste under 172 nm excitation was 81%, but was increased up to 86% and 89% when 0.05 mol of Al and 0.1 mol of Al were added to BSMS, respectively. In other words, luminance retaining ratio also monotonously increases with increasing amount of Al added. Furthermore, given that luminance of the additive (Al)-free BSMS after heating of a phosphor paste is 100, all of the phosphor pastes containing Al had a higher luminance value than that of the additive-free BSMS, e.g., luminance after heating of the phosphor paste of interest was 113 in result of adding 0.05 mol of Al and 103 as a result of adding 0.1 mol of Al.

The following will now explain about emission characteristics under 146 nm excitation. As depicted in FIG. 4, luminance retaining ratio of an additive-free BSMS before and after heating of a phosphor paste under 146 nm excitation was 76%, but was increased up to 80% and 82% when 0.05 mol of Al and 0.1 mol of Al were added to BSMS, respectively. Given that luminance of the additive (Al)-free BSMS after heating of a phosphor paste is 100, luminance after heating of the phosphor paste of interest was increased to 109 as a result of adding 0.05 mol of Al, while 96 as a result of adding 0.1 mol of Al. These results reveal that advantageous improvements in luminance retaining ratio as a result of Al addition are more noticeable under 172 nm excitation than under 146 nm excitation, which also coincide with the comparison results before and after washing.

Both studies described above confirm that the Eu activated silicate phosphor, BSMS, containing Al can suppress luminance degradation in phosphors as well as luminance degradation through the fabrication process of a phosphor layer thereof. Also, as noted earlier, the advantageous effects were more remarkable under 172 nm excitation.

EMBODIMENT 4

Figure 7:
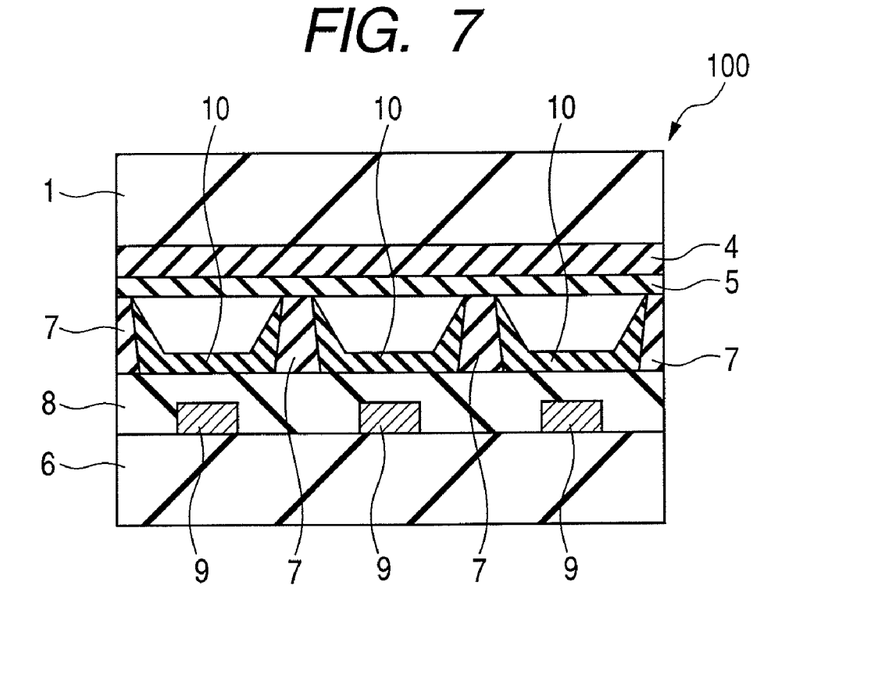
FIG. 7 is an exploded cross-sectional view showing the structure of main parts of the plasma display panel in accordance with one embodiment of the present invention.
Figure 8:
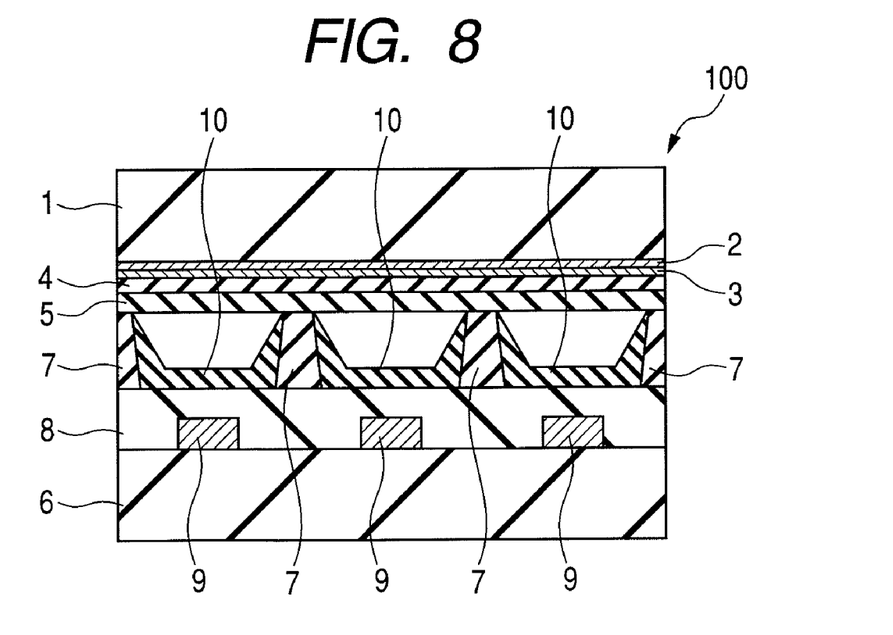
FIG. 8 is an exploded cross-sectional view showing the structure of main parts of the plasma display panel in accordance with one embodiment of the present invention.
Figure 9:
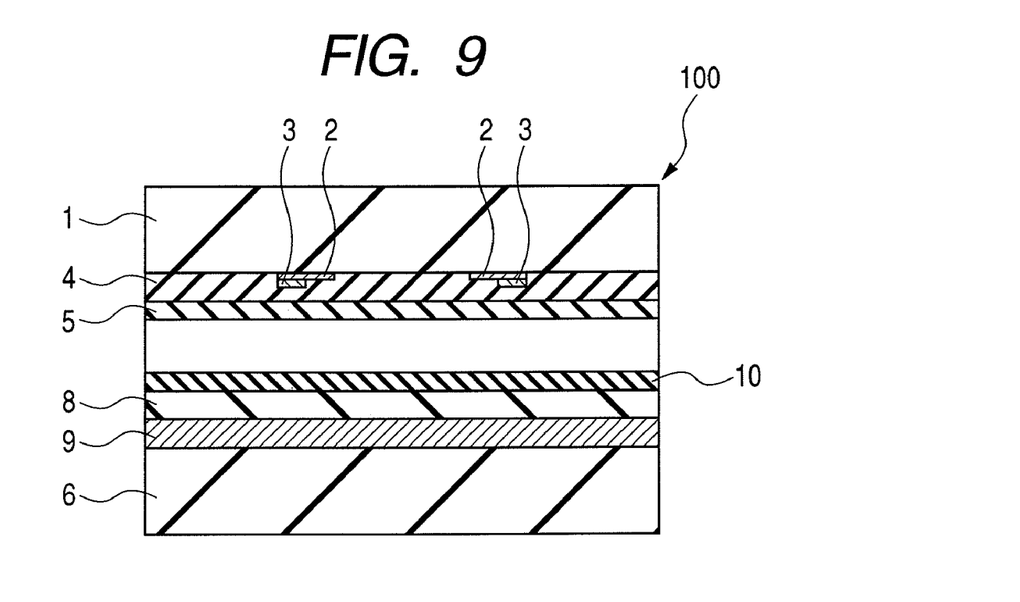
FIG. 9 is an exploded cross-sectional view showing the structure of main parts of the plasma display panel in accordance with one embodiment of the present invention.

A PDP using the Eu activated silicate phosphor of the present invention was fabricated. As for a phosphor to configure a phosphor layer, two kinds of phosphors, that is, the silicate phosphor (BSMS) containing 0.05 mol of Al of the present invention synthesized in the first embodiment and the additive (Al)-free BSMS were used to fabricate a PDP 100 shown in FIGS. 6 through 9. FIG. 6 is an exploded perspective view of main parts showing the structure of a PDP according to an embodiment of the present invention. Moreover, FIGS. 7, 8, and 9 are cross-sectional views showing main parts of the structure of PDP according to an embodiment of the present invention.

In order to fabricate the PDP 100, first, an address electrode 9 made of Ag or the like and a dielectric layer 4 made of a glass-based material are formed over a rear substrate 6. Then, a barrier rib material similarly made of a glass-based material is printed as a thick film, and blast cleaning was carried out using a blast mask to form a barrier rib 7. Next, a phosphor layer 10 was formed over the barrier rib 7 in a stripe pattern so as to cover a groove surface (wall surface) between the barrier ribs 7.

To prepare each phosphor layer 10, 35 wt % of a phosphor powder and 65 wt % of a mixture of cellulose based resin, diethyl glycol monobutyl ether, and diethyl glycol monobutyl were weighed and fully kneaded together to obtain a phosphor paste. The produced phosphor paste was applied by screen printing. The phosphor layers were then subjected to drying and heating to evaporate volatile components and burn-off organic substances in the phosphor paste.

Next, a front substrate 1 bearing display electrodes 2, bus-electrodes 3, a dielectric layer 4 and a protective layer 5 was sealed with the back substrate 6 with a frit and the inside of the panel was evacuated. Afterwards, a discharge gas was filled into the panel, and the panel was sealed. The discharge gas is a gas mixture containing neon (Ne) as the principal component and xenon (Xe) gas with the mole fraction of 12%.

Lastly, the PDP 100 was aged over a predetermined period of time under the discharge voltage of 250V and frequency of 30 kHz.

The PDP 100 according to the present embodiment has the display region of a square shape in size of is 100 mm (w)×100 mm (l). To produce the conventional color display, the phosphor layers 10 are sequentially applied by phosphor layers made of phosphors corresponding to emissions of three colors of red (R), green (G) and blue (B), respectively. One pixel has a pitch of 1000 μm×1000 μm.

Figure 10:
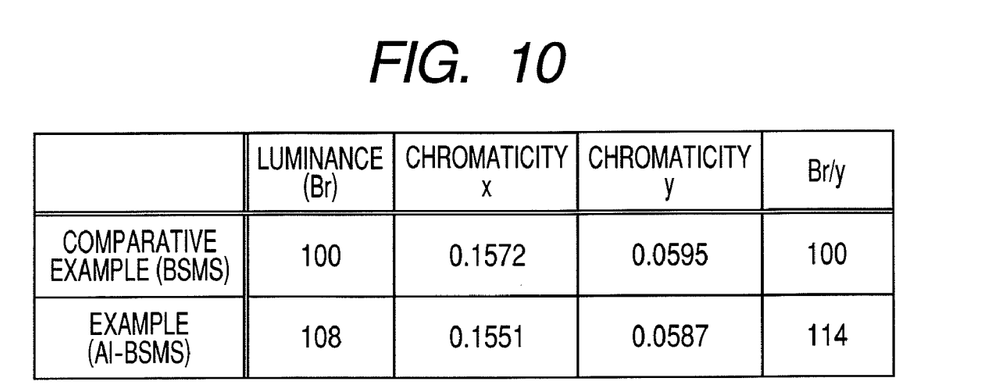
FIG. 10 is a table summarizing emission characteristics of a plasma display panel using BSMS-Al mixture in accordance with the present invention in comparison with emission characteristics of a plasma display panel using BSMS.

Next, a plasma display device was manufactured using the PDP 100 including the Al-containing BSMS according to the present invention in comparison with a plasma display device using the PDP 100 including the conventional BSMS described above. Each plasma display device was incorporated with a driving circuit to enable discharge and lighting. To these plasma display devices were applied a sustain discharge pulse of 250V and a frequency of 2 kHz for drive, discharge and lighting. As to each lighting display region, the brightness (Br) of the blue emission after the completion of aging, and the chromaticity (x, y) as the color characteristics of the emitted blue light were evaluated. Then, by using the y value of the obtained chromaticity (x, y), the evaluated brightness (Br) was divided by the y value, so as to calculate Br/y as a parameter for easy evaluation of the emission efficiency. FIG. 10 illustrates emission characteristics of a plasma display panel using a phosphor according to the present invention in comparison with emission characteristics of a plasma display panel using a phosphor according to the comparative example. Similarly to the results from heating of the phosphor paste, luminance and Br/y value were higher in the example (Al-containing BSMS) to which 0.05 mol of Al was added than in the comparative example (Al-free BSMS). Accordingly, a PDP characterized of a lower chromaticity y value and blue emission of high color purity can be manufactured.

In the foregoing, the invention made by the inventors has been concretely described based on the embodiments. However, it is needless to say that the present invention is not limited to the foregoing embodiments, and various modifications and alterations can be made within the scope of the present invention.

The present invention can be utilized for a PDP using the Eu activated silicate phosphor to emit light by excitation by ultraviolet light, and furthermore, it can be utilized for a plasma display device to display video with a driving circuit for driving the PDP and a video source.

What is claimed is:

1. A plasma display device comprising:
a pair of substrates arranged at a distance so as to face each other;
barrier ribs arranged between the pair of substrates, for defining a space between the pair of substrates;
an electrode pair arranged on at least one of facing sides of the pair of substrates;
a discharge gas sealed in the space defined by the barrier ribs, for generating ultraviolet light as a result of electric discharge upon application of a voltage to the electrode pair; and
a phosphor layer containing a phosphor for emitting light as a result of excitation by the ultraviolet light, formed on at least one of the facing sides of the pair of substrates and wall surfaces of the barrier ribs in the space,
wherein the phosphor contains an Eu activated silicate phosphor added with at least one element selected from a group consisting of Al, Ga, Y and Gd, represented by the following General Formula (1):

$$M1_{3-y}M2Si_2O_8:Eu_y \qquad (1)$$

where M1 is at least one element selected from the group consisting of Ba, Ca, and Sr; M2 is at least one element selected from the group consisting of Mg and Zn; and y satisfies the condition of $0.001 \leq y \leq 0.2$,
wherein a lattice structure of the phosphor is tetrahedron structures of $SiO_4$.

2. The plasma display device according to claim 1, wherein at least one element selected from the group consisting of Al, Ga, Y, and Gd is added at an amount less than 0.2 mol to a total of 1 mol of the phosphor.

3. The plasma display device according to claim 2, wherein the phosphor obtains Al by reacting with at least one compound selected from the group consisting of $Al_2O_3$, $AlF_3$, AlN, $Al(OH)_3$ and $(CH_3COO)_3Al$ used as a starting material.

4. The plasma display device according to claim 2, wherein at least one element selected from the group consisting of Al, Ga, Y, and Gd is filled into an octahedron gap between the $SiO_4$ tetrahedron structures, or is a substitute for a constituent element of the lattice.

5. The plasma display device according to claim 1, wherein the phosphor contains the Eu activated silicate phosphor represented by the General Formula (2) and at least one element selected from the group consisting of Al, Ga, Y, and Gd added at an amount less than 0.2 mol to a total of 1 mol of the phosphor:

$$(Ba_zM3_{1-z})_{3-y}M2Si_2O_8:Eu_y \qquad (2)$$

wherein M3 is at least one element selected from the group consisting of Ca and Sr; M2 is at least one element selected from the group consisting of Mg and Zn; and z satisfies the condition of $0 \leq z \leq 0.3$.

6. The plasma display device according to claim 5, wherein the phosphor obtains Al by reacting with at least one compound selected from the group consisting of $Al_2O_3$, $AlF_3$, AlN, $Al(OH)_3$ and $(CH_3COO)_3Al$ used as a starting material.

7. The plasma display device according to claim 3, wherein at least one element selected from the group consisting of Al, Ga, Y, and Gd is filled into an octahedron gap between the $SiO_4$ tetrahedron structures, or is a substitute for a constituent element of the lattice.

8. The plasma display device according to claim 1, wherein the phosphor contains the Eu activated silicate phosphor represented by the General Formula (3) and at least one element selected from the group consisting of Al, Ga, Y, and Gd:

$$(Ba_xSr_{1-x})_{3-y}MgSi_2O_8:Eu_y \qquad (3)$$

where x satisfies the condition of $0 < x \leq 0.3$.

9. The plasma display device according to claim 8, wherein Al is added at an amount less than 0.2 mol to a total of 1 mol of the phosphor.

10. The plasma display device according to claim 9, wherein Al is added at an amount not larger than 0.11 mol to a total of 1 mol of the phosphor.

11. The plasma display device according to claim 8, wherein the phosphor is an Eu activated silicate phosphor represented by the General Formula (4):

$$(Ba_xSr_{1-x})_{3-y}Mg_{1-a}Al_{a+b}Si_{2-b}O_8:Eu_y \qquad (4)$$

where a and b satisfy the conditions of $0 \leq a$, $0 \leq b$ and $0 < a+b < 0.2$, respectively.

12. The plasma display device according to claim 11, wherein a and b satisfy the condition of $0 < a+b \leq 0.11$.

13. The plasma display device according to claim 8, wherein the phosphor obtains Al by reacting with at least one compound selected from the group consisting of $Al_2O_3$, $AlF_3$, AlN, $Al(OH)_3$ and $(CH_3COO)_3Al$ used as a starting material.

14. The plasma display device according to claim 8, wherein at least one element selected from the group consisting of Al, Ga, Y, and Gd is filled into an octahedron gap between the $SiO_4$ tetrahedron structures, or is a substitute for a constituent element of the lattice.

15. The plasma display device according to claim 1, wherein the phosphor obtains Al by reacting with at least one compound selected from the group consisting of $Al_2O_3$, $AlF_3$, AlN, $Al(OH)_3$ and $(CH_3COO)_3Al$ used as a starting material.

16. The plasma display device according to claim 1, wherein the discharge gas contains Xe in a mole fraction of 6% or more.

17. The device of claim 16, wherein the discharge gas contains Xe in a mole fraction of 10% or more.

18. The plasma display device according to claim 17, wherein the discharge gas contains Xe in a mole fraction of 12% or more.

19. The plasma display device according to claim 1, wherein at least one element selected from the group consisting of Ai, Ga, Y, and Gd is filled into an octahedron gap between the $SiO_4$ tetrahedron structures, or is a substitute for a constituent element of the lattice.

* * * * *